United States Patent [19]

Price

[11] Patent Number: 5,282,516
[45] Date of Patent: Feb. 1, 1994

[54] REGENERATIVE STEERING SYSTEM FOR HYDROSTATIC DRIVES

[75] Inventor: Robert J. Price, Dunlap, Ill.

[73] Assignee: Caterpillar Inc., Peoria, Ill.

[21] Appl. No.: 891,107

[22] Filed: Jun. 1, 1992

[51] Int. Cl.$^5$ ............................................. B62D 11/04
[52] U.S. Cl. .................... 180/6.3; 180/132; 180/6.48
[58] Field of Search ............ 180/132, 6.3, 6.48, 180/6.2

[56] References Cited

U.S. PATENT DOCUMENTS

| | | | |
|---|---|---|---|
| 3,461,744 | 8/1969 | Booth | 180/6.3 |
| 3,862,668 | 1/1975 | Ward | 180/6.48 |
| 3,872,669 | 3/1975 | Ward | 180/6.48 X |
| 4,044,786 | 8/1977 | Yip | 180/132 X |
| 4,235,297 | 11/1980 | Porta | 180/6.48 |
| 4,415,050 | 11/1983 | Nishida et al. | 180/6.48 |
| 4,457,387 | 7/1984 | Taylor | 180/6.48 |
| 4,470,260 | 9/1984 | Miller et al. | 180/132 X |
| 4,715,459 | 12/1987 | Stahl | 180/6.48 |
| 4,947,948 | 8/1980 | Dückinghaus | 180/132 X |

FOREIGN PATENT DOCUMENTS 1614946  12/1990  U.S.S.R. .............. 180/6.48

Primary Examiner—Karin L. Tyson
Assistant Examiner—Florian Zeender
Attorney, Agent, or Firm—John W. Grant

[57] ABSTRACT

Steering systems are normally incorporated into hydrostatic drive systems for use on track-type vehicles. The currently available steering systems do not take advantage of the potential energy created by slowing down the inside track during a steering maneuver. The subject regenerative steering system includes positioning a pair of reversing valves between a source of pressurized fluid and a pair of motor/pump units drivingly connected to a pair of tracks. Each of the variable displacement motor/pump units includes a displacement controller for controlling the displacement of the motor/pump unit. To initiate a steering maneuver, a control signal is directed to the displacement controller of one of the motor/pump units to change the displacement of the motor/pump unit causing the track to slow down and start driving the motor/pump unit. The reversing valve disposed between the source of pressurized fluid and the one motor/pump unit is shifted from one discrete position to another discrete position so that the fluid pumped from the one motor/pump unit supplements the fluid flow to the other motor/pump unit in a regenerative manner. By converting the energy required to slow the one track into fluid power, the speed of the vehicle will not drop as drastically as it would without the regenerative type steering.

6 Claims, 1 Drawing Sheet

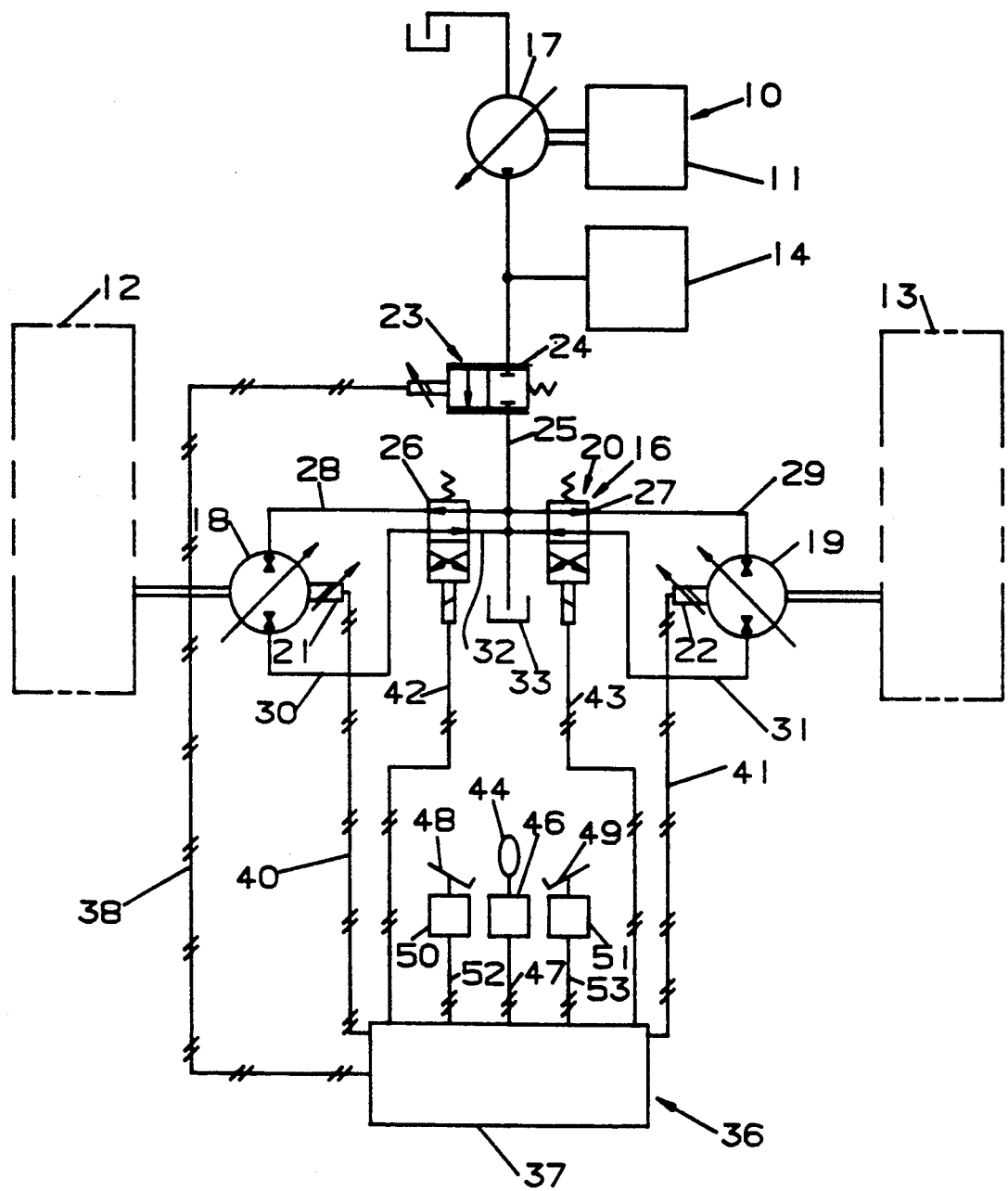

REGENERATIVE STEERING SYSTEM FOR HYDROSTATIC DRIVES

DESCRIPTION

Technical Field

This invention relates generally to track-type vehicles having hydrostatic drives and more particularly to a regenerative steering system for a hydrostatic drive.

Background Art

Many track-type vehicles have hydrostatic drives as the travel drive system. Two common types of hydrostatic drives used on track-type vehicles are the open center system and the dual path closed center system. The open center system has a pair of hydraulic drive motors individually connected to the tracks with the motors receiving fluid from one or more pumps through a pair of control valves. The output speed of the motors and, hence, the travel speed of the tracks is controlled by manipulation of the control valves to control the amount of fluid flow to the motors. The fluid exhausted from the motors is returned to the tank. Steering of such vehicles is accomplished by moving one of the control valves toward its closed position to reduce fluid flow to one of the track motors.

The force required to turn a track-type vehicle are much greater than the force required to overcome motion resistance. The ratio of the force at the tracks to steer versus the force to overcome motion resistance is about 5/1. Thus, much more power is required to steer a track vehicle than is required to overcome motion resistance. Consequently, if the majority of the engine power is being used for obtaining the desired travel speed with the open loop system, the vehicle will slow down drastically during major steering maneuvers.

The dual path closed loop hydrostatic drive system has a pump and motor combination dedicated to each track. The travel speed of the vehicle is controlled either by controlling the displacement of the pump only or by controlling the displacement of both the pump and motor. Steering is accomplished by reducing the displacement of the pump or a combination of pump and motor. The dual path hydrostatic drive system provides improved steering efficiency over the open loop system described above. More specifically, power to the inside track may be regenerated wherein the inside track motor acts as a pump to drive the associated pump acting as a motor to power the gear drive connected to the pumps. Thus, for the same size vehicle having the same horsepower, the speed in a turn for a dual path hydrostatic drive system would be somewhat greater than that of a vehicle having an open center hydrostatic drive system.

However, the disadvantage of having a dual path closed loop system is that the travel pumps cause system losses when they are not used for propelling the vehicle. Another disadvantage is that the implement pump output is not utilized during travel. Still another disadvantage is the cost of two additional pumps, additional pump drives, mounting of the additional pumps, and routing of the conduits connecting the pumps to the motors particularly on a track-type hydraulic excavator wherein the upper carriage rotates relative to the undercarriage.

Thus, it would be desirable to have a hydrostatic drive system which utilizes the implement pump or pumps for providing fluid to the drive system thereby eliminating the cost of additional pumps dedicated solely to driving the vehicle. It would also be desirable to provide a hydrostatic drive having greater regeneration efficiency during a turning maneuver than the dual path hydrostatic drive system.

The present invention is directed to overcoming one or more of the problems as discussed above.

DISCLOSURE OF THE INVENTION

In one aspect of the present invention, a regenerative steering system is provided for a hydrostatic drive having a pair of variable displacement motor/pump units drivingly connected to a pair of tracks disposed at opposite sides of a track-type vehicle with each of the units having a displacement controller for controlling the displacement of the unit. The steering system comprises a means connected in parallel to the motor/pump units for supplying pressurized fluid thereto at a variable flow rate. A pair of reversing valves are individually disposed between the fluid supplying means and the units and are moveable between first and second fixed operating positions with both valves being moved to the first position to cause both tracks to be driven in a first travel direction and moved to the second position to cause both tracks to be driven in an opposite travel direction. A steering control means is provided for changing the displacement of one of the units sufficiently to decrease the speed of the track driven by the one unit and for moving the reversing valve associated with the one unit from one of its positions to its other position so that fluid is pumped from the one unit and supplements the fluid being directed to the other unit.

BRIEF DESCRIPTION OF THE DRAWINGS

The sole FIGURE is a schematic illustration of an embodiment of the present invention.

BEST MODE FOR CARRYING OUT THE INVENTION

A vehicle 10 includes an engine 11, left and right hand tracks 12,13, an implement system 14 and a hydrostatic drive system 16. The hydrostatic drive system 16 includes a variable displacement pump 17 driven by the engine 11 and connected to the implement system 14, a pair of variable displacement motor/pump units 18,19 drivingly connected to the left and right hand tracks 12,13 respectively and a regenerative steering system 20. Each of the motor/pump units 18,19 has a displacement controller 21/22 for controlling the displacement of the units proportional to control signals directed thereto. The motor/pump units can function as either a motor or a pump depending upon the circumstances.

A means 23 is provided for supplying pressurized fluid at a variable flow rate in parallel to the motor/pump units 18,19 wherein the flow rate and the displacement setting of the motor/pump units establishes a travel speed of the vehicle. The means 23 includes the variable displacement pump 17 and an electrohydraulic proportional control valve 24 connected to the pump 17. The valve 24 is resiliently biased to the blocking position shown and is moved to an infinitely variable operating position in proportion to an electrical signal received thereby. The variable displacement pump is the type which delivers fluid flow in quantities needed to satisfy the fluid demand by the valve 24 and/or implement system 14.

A supply conduit 25 connects the valve 24 in parallel to a pair of solenoid actuated discrete position reversing valves 26,27. A pair of forward drive motor conduits 28,29 and a pair of reverse drive conduits 30,31 connect the motor/pump units 18/19 to the reversing valves 26,27. A return conduit 32 connects both of the reversing valves to a tank 33. The reversing valves are spring biased to a discrete forward drive position shown at which the supply conduit 25 is communicated to the forward drive conduits 28,29 to cause both tracks 12,13 to be driven in a first or forward travel direction. Both reversing valves 26,27 are moved to a discrete reverse drive position at which the supply conduit 25 communicates with the reverse drive motor conduits 30,31 to cause both tracks to be driven in the reverse travel direction.

A steering control means 36 is provided for changing the displacement of one of the motor/pump units 18,19 sufficiently to decrease the speed of the track 12 or 13 driven by the one unit and for moving the associated one of the reversing valves 26,27 from one of its discrete positions to its other discrete position so that fluid is pumped from the one unit and supplements the fluid being directed to the other unit from the pump 17. More specifically, the steering control means includes a microprocessor 37 connected to the valve 24 through a control signal line 38, the displacement controllers 21,22 through a pair of control signal lines 40,41 and to the reversing valves 26,27 through control signal lines 42,43. A directional control lever 44 is connected to a signal generator 46 which in turn is connected to the microprocessor through a command signal line 47. A pair of steering control pedals 48,49 are connected to a pair of steering signal generators 50,51 which in turn are connected to the microprocessor through command signal lines 52,53.

INDUSTRIAL APPLICABILITY

In operation, straight travel in a forward direction is initiated by moving the directional control lever 44 in the appropriate direction to transmit a command signal through the signal line 47 to the microprocessor 37. The microprocessor initially outputs a control signal through the lead line 38 to move the proportional valve 24 to an operating position. Pressurized fluid is pumped from the pump 17 through the valve 24, the supply conduit 25, the reversing valves 26,27 and the forward motor conduits 28,29 to drive the motor/pump units 18,19 in a forward direction. Initially, both of the motor/pump units are at their maximum displacement low speed setting to provide maximum torque to the tracks 12,13. If the travel speed corresponding to the command signal outputted to the microprocessor cannot be achieved solely by changing the displacement of the pump 17, appropriate signals are directed through the signal lines 40,41 to the displacement controllers 22,23 to decrease the displacement setting of the motor pump units so that their output speed to the tracks is increased.

Steering the vehicle to the right, for example, is accomplished by actuation of foot pedal 49 causing the signal generator 51 to output a command signal to the microprocessor 37. The microprocessor initially directs a control signal through the source line 41 to the displacement controller 22 of the motor/pump unit 19 to decrease its displacement. By decreasing the displacement, the torque transmitting capability of the motor/pump unit 19 is decreased causing the inside track 13 to slow down. The microprocessor then transmits a control signal through signal line 43 to shift the reversing valve 27 to its second position. The control signal being transmitted to the displacement controller 23 is then modified to increase the displacement of the motor/pump unit 19 which functions as a ground driven pump to direct pressurized fluid through the conduit 31, the reversing valve 27 and into the supply conduit 25 where it supplements the fluid flow from the pump to the motor/pump unit 18. This provides additional hydraulic power to the outside track 12 so that the travel speed remains higher than could be accomplished without the regenerative action.

Steering the vehicle to the left is accomplished in a similar manner by depressing the foot pedal 48. Likewise, driving the vehicle in the reverse direction is accomplished in a manner similar to that described above by moving the lever 44 in the opposite direction. However, in the reverse drive direction, the microprocessor 37 outputs control signals through the signal lines 42,43 to move the reversing valves 26,27 to their other positions. At the other positions, fluid from the pump 17 is directed through the reverse drive conduits 30,31 to drive the motor/pump units 18,19 and hence the tracks 12,13 in the reverse direction.

In view of the foregoing, it is readily apparent that the structure of the present invention provides an improved regenerative steering system for a hydrostatic drive which utilizes a pump that also provides fluid to the implement system of the vehicle. This eliminates the cost of providing separate pumps for the implement and track drive systems. Use of a single pump for both functions reduces the parasitic loads on the engine if separate pumps are used for each function. The combination of the variable displacement motor/pump units and the pair of reversing valves also greatly increases the efficiency of the steering system since the energy required to stop the inside track during a turn is converted to hydraulic power to drive the motor/pump unit connected to the outside track.

Other aspects, objects and advantages of this invention can be obtained from a study of the drawings, the disclosure and the appended claims.

I claim:

1. A regenerative steering system for a hydrostatic drive having a pair of variable displacement motor/pump units individually drivingly connected to a pair of tracks disposed at opposite sides of a track-type vehicle, each of the motor/pump units having a displacement controller for changing the displacement of the motor/pump unit comprising:

means for supplying pressurized fluid at a variable flow rate in parallel to the motor/pump units for driving the motor/pump units wherein the flow rate and the displacement setting of the motor/pump units establishes a travel speed of the vehicle;

a pair of reversing valves individually disposed between the pressurized fluid supplying means and the motor/pump units and being moveable between first and second discrete operating positions with both valves being moved to their first discrete position to drive both motor/pump units and hence both tracks in a first travel direction and moved to the second position to drive both tracks in an opposite travel direction; and steering control means for changing the displacement of one of the motor/pump units sufficiently to cause the speed of the track driven by the one motor/pump unit to decrease and for moving the reversing valve associated with the one motor/pump unit from one of its positions to its other position so that fluid is pumped from the one unit through the associated reversing valve and supplements the flow of fluid being directed to the other motor/pump unit from the fluid supplying means.

2. The regenerative steering system as set forth in claim 1 wherein the pressurized fluid supplying means includes a pump and a control valve disposed between the pump and the reversing valves, the control valve being moveable between a flow blocking position and an infinitely variable operating position.

3. The regenerative steering system as set forth in claim 2 wherein the steering control means decreases the displacement of the one motor/pump unit and subsequently increases the displacement of the one motor/pump unit after the associated reversing valve is shifted to its other position.

4. The regenerative steering system as set forth in claim 3 wherein the fluid supply means includes a supply conduit connecting the control valve in parallel to the reversing valves with the fluid pumped from the one motor/pump unit being directed into the supply conduit.

5. A regenerative steering method for a hydrostatic drive having a pair of variable displacement motor/pump units each associated with a reversing valve and being individually drivingly connected to a pair of tracks disposed at opposite sides of a track-type vehicle comprising the steps of:

changing the displacement of one of the motor/pump units sufficiently to cause the speed of the track driven by the one motor/pump unit to decrease;

shifting the reversing valve associated with the one motor/pump unit from one of its operating positions to another operating position; and directing fluid pumped from the one motor/pump unit through the reversing valve associated therewith to the other motor/pump unit.

6. The regenerative steering method of claim 5 wherein the displacement changing step includes decreasing the displacement of the one motor/pump unit and including the step of increasing the displacement of the one motor/pump unit after the reversing valve is shifted to its another operating position.

* * * * *